United States Patent [19]

Ho

[11] 4,380,041
[45] Apr. 12, 1983

[54] CAPACITOR PRESSURE TRANSDUCER WITH HOUSING

[75] Inventor: Roland K. Ho, McHenry, Ill.

[73] Assignee: Motorola Inc., Schaumburg, Ill.

[21] Appl. No.: 314,811

[22] Filed: Oct. 26, 1981

Related U.S. Application Data

[63] Continuation of Ser. No. 133,237, Mar. 24, 1980, abandoned, which is a continuation of Ser. No. 945,284, Sep. 25, 1978.

[51] Int. Cl.³ .............................................. H01G 7/00
[52] U.S. Cl. .................................... 361/283; 73/718; 73/724
[58] Field of Search ....................... 361/283, 718, 724

[56] References Cited

U.S. PATENT DOCUMENTS

| | | | |
|---|---|---|---|
| 2,751,530 | 6/1956 | Armstron | 361/283 |
| 3,352,157 | 11/1967 | Seegmiller | 73/724 |
| 3,405,559 | 10/1968 | Moffatt | 361/283 |
| 3,697,835 | 5/1971 | Satori | 73/718 |
| 3,808,480 | 4/1974 | Johnston | 361/283 |
| 4,178,621 | 12/1979 | Simonelic | 361/283 |

Primary Examiner—Elliot A. Goldberg
Attorney, Agent, or Firm—Phillip H. Melamed; James W. Gillman

[57] ABSTRACT

An improved ceramic capacitive pressure transducer adaptable for use in automobiles is disclosed. The pressure transducer comprises a thin flexible diaphragm disc having a capacitor electrode deposited on it. A thick cylindrical base substrate has a top surface with a second capacitor electrode deposited thereon and the diaphragm is bonded to the top surface of the base substrate by an annular glass ring such that the first and second electrodes are separated from each other and face each other directly across an air gap. The diaphragm, the top surface of the base substrate and the annular glass ring form an internal cavity in which a reference vacuum is stored. In response to pressure changes outside of this cavity, the diaphragm will flex and thereby change the capacitance created by the first and second electrodes. The base substrate has an integral annular flange laterally extending with respect to and beyond the top surface of the base and located below the top surface and between the top and bottom surfaces. A sealing rubber O-ring is mounted on the flange and is used to sealingly mount the transducer to a housing wall without applying stress to the diaphram.

12 Claims, 4 Drawing Figures

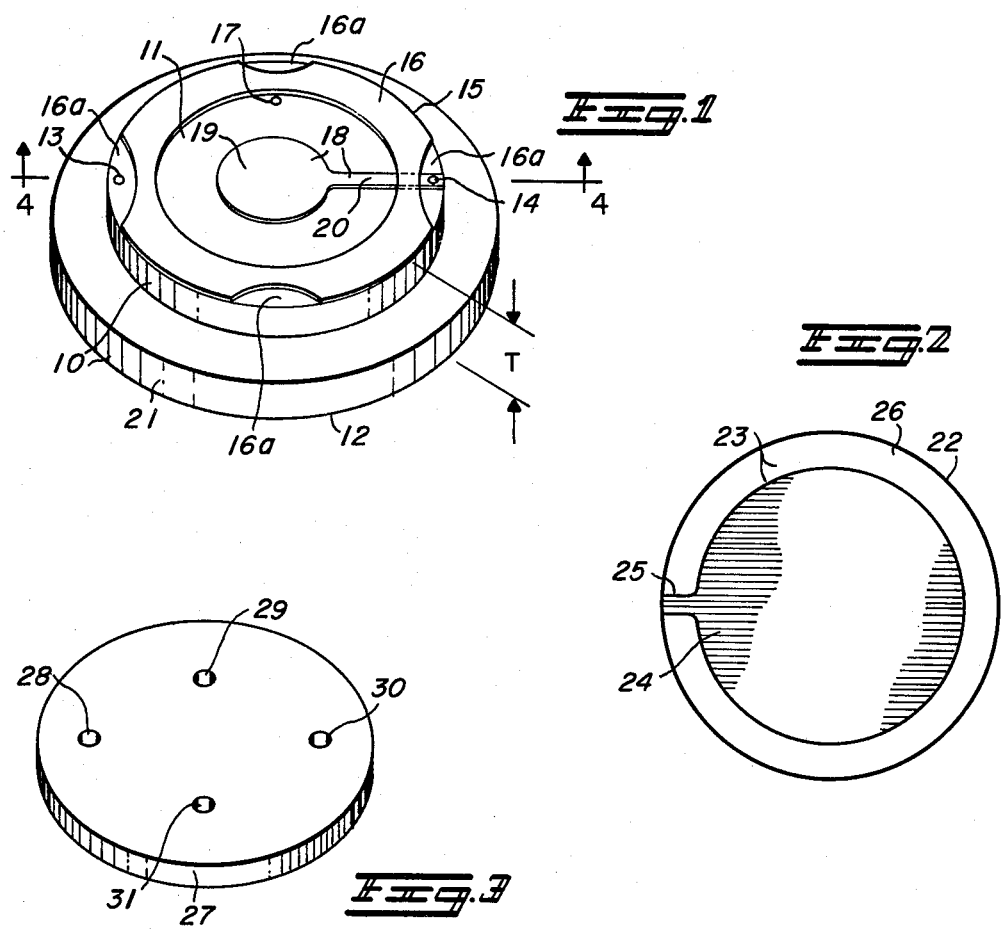
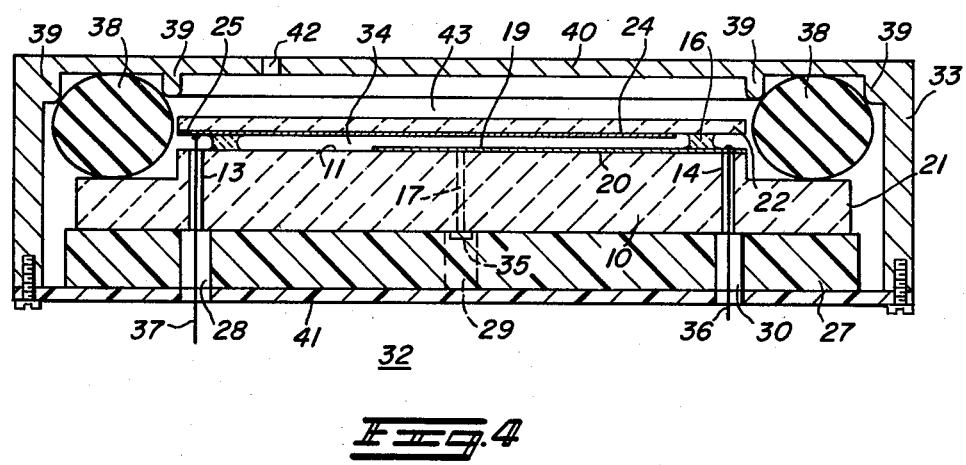

CAPACITOR PRESSURE TRANSDUCER WITH HOUSING

This is a continuation, of application Ser. No. 133,237, filed Mar. 24, 1980 now abandoned which was a continuation of application Ser. No. 945,284 filed Sept. 25, 1978 now abandoned.

BACKGROUND OF THE INVENTION

The present invention relates generally to the field of electromechanical pressure sensors and more particularly to the field of ceramic capacitive pressure transducers.

Ceramic capacitive pressure transducers are known and generally comprise parallel plate capacitor electrodes separated by an air gap wherein the spacing between the parallel plate electrodes is altered in response to a sensed pressure thereby changing the capacitance created by these electrodes. Generally, one capacitor electrode is deposited on a top end surface of a relatively thick cylindrically shaped ceramic base substrate while the other capacitor electrode is deposited on a relatively thin disc-shaped ceramic pressure sensing diaphragm. An annular glass insulating ring is deposited on a peripheral portion of the base substrate top surface and is used to bond the diaphragm to the base substrate as well as to space the diaphragm electrode a predetermined distance away from the base substrate electrode.

Typically, the diaphragm, the annular glass ring and the base substrate are assembled into a sandwich type structure and then heated to form an integral assembly such that the capacitor electrodes are spaced apart by a predetermined distance totally dependent upon the thickness of the annular glass ring. Generally, a vacuum entryway hole is provided through the base substrate, and through this hole a predetermined reference vacuum pressure is applied to an internal cavity formed by the diaphragm, the annular glass ring and the base substrate. Subsequently, the vacuum entryway is sealed so that the internal cavity will maintain (store) a predetermined reference vacuum pressure.

By applying various degrees of pressure to the exterior of the capacitive pressure transducer, the transducer diaphragm is flexed by predetermined amounts and this results in changing the capacitance created by the capacitor electrodes since the flexing of the diaphragm changes the spacing between the electrodes. Thus by monitoring the capacitance created by the electrodes, the ceramic capacitor transducer will produce an electrical signal related to the magnitude of the exterior pressure applied to the diaphragm as compared to the magnitude of the reference vacuum pressure. Such transducers are readily adaptable for sensing vacuum pressures generated by automobile internal combustion engines.

Typically, the ceramic capacitor transducer is mounted to a housing wall by means of a flexible rubber O-ring which spaces the flexible diaphragm from the housing wall so as to form an exterior cavity essentially bounded by the housing wall, the flexible diaphragm and the O-ring. A through hole opening is provided in the housing wall and through this opening various pressures are applied to the exterior cavity which result in flexing the diaphragm and thereby altering the capacitance created by the pressure transducer. Generally the sealing O-ring has been mounted directly on an annular peripheral portion of the flexible diaphragm.

Pressure transducers constructed and assembled according to the foregoing descriptions have often been found to produce erratic pressure sensing readings or readings which did not directly vary in response to the sensed pressure. The present invention determined that these erratic readings were due to the stress applied to the pressure sensing diaphragm because of the assembly of the transducer to the housing wall. The present invention eliminates these erratic pressure sensing readings by providing an improved pressure sensor which can be mounted to a housing wall to create a pressure transducer assembly without applying any significant stress to the flexible diaphragm.

SUMMARY OF THE INVENTION

An object of the present invention is to provide an improved pressure transducer and assembly which overcomes the aforementioned deficiencies.

A more specific object of the present invention is to provide an improved capacitive pressure transducer and assembly which has less stress applied to a pressure sensing flexible diaphragm when the transducer is mounted to a housing wall.

According to the present invention an improved pressure transducer having a pressure displaceable diaphragm whose position determines electrical characteristics of the transducer is provided. The pressure transducer is adaptable for mounting to a housing wall and comprises: base substrate means having a top surface with a peripheral portion and a bottom surface; flexible diaphragm means having a planar central portion and a surrounding peripheral portion along the perimeter of the diaphragm means; mounting means for mounting said peripheral portion of said diaphragm means to said base substrate top surface peripheral portion, said mounting means, said diaphragm planar central portion and said substrate top surface generally forming an internal cavity, said diaphragm central portion being displaceable with respect to said top surface in response to pressure changes, wherein said internal cavity maintains a fixed reference pressure and pressures applied exterior to said internal cavity caused said diaphragm means to flex and thereby alter electrical characteristics of said transducer in response to pressure changes; and a flange means attached to said base substrate means and extending laterally with respect to and beyond said top surface peripheral portion and said peripheral portion of said diaphragm means, whereby said flange means forms a mounting ledge by which said transducer can be mounted without applying stress to said diaphragm means:

More specifically, the present invention provides for utilizing the above described pressure transducer in a pressure transducer assembly in which an annular sealing means is mounted on the extending flange means, and mounting means is provided for mounting the transducer and the annular sealing means to a housing wall wherein the sealing means, the housing wall and the flexible diaphragm means essentially form an external cavity to which pressures can be applied to cause displacement of the flexible diaphragm means to thereby alter the electrical characteristics of the pressure transducer in response to pressure changes. The above described pressure transducer assembly provides for mounting a pressure transducer while applying substantially no stress to the flexible diaphragm means. This has been found to reduce the occurrence of erratic pressure sensing readings often obtained from prior art pressure transducers as well as improve the pressure versus reading correlation of these transducers.

BRIEF DESCRIPTION OF THE DRAWINGS

For a more complete understanding of the invention reference should be made to the drawings, in which:

FIG. 1 is a perspective view of a metallized base substrate of a ceramic capacitive pressure transducer;

FIG. 2 is a plane view of a metallized ceramic diaphragm of a ceramic pressure transducer;

FIG. 3 is a perspective view of a mounting spacer disc; and

FIG. 4 is a cross-sectional view of a ceramic capacitive pressure transducer assembly mounted in a housing which utilizes the components shown in FIGS. 1-3.

DESCRIPTION OF THE PREFERRED EMBODIMENT

Referring to FIG. 1, a relatively thick generally cylindrically shaped ceramic base substrate 10 of a ceramic capacitive pressure transducer is illustrated. The base substrate 10 has a thickness T, a planar substantially circular top end surface 11 having a first diameter dimension, a planar substantially circulat bottom end surface 12 having a larger diameter dimension, and through holes 13 and 14 located along a planar, substantially annular, peripheral portion 15 of the circular top surface 11 which surrounds a central area of the top surface 11. The holes 13 and 14 extend from the surface 11 to the bottom surface 12. A substantially annular ring 16 of insulating glass material is provided on the peripheral portion 15 of the top surface 11. The glass ring 16 has four outer peripheral indentations 16a, two of which provide clearance between the ring 16 and the through holes 13 and 14. Within this glass annular ring 16, a vacuum entryway through hole 17 is provided and extends from the top surface 11 to the bottom surface 12. A metallic electrode area 18 is provided on the top surface 11 and comprises a substantially circular metallization portion 19 located within the annular ring 15 and a radially extending finger portion 20 extending from the circular electrode portion 19, underneath the glass insulating ring 16 to the through hole 14. The ceramic base substrate 10 includes an integral annular flange 21 which extends laterally outward with respect to and beyond the peripheral portion 15 of the top surface 11 and is located below the top surface 11 and between the top and bottom surfaces of the base substrate 10. The function of the flange 21 is to provide a mounting shoulder for an elastic sealing O-ring so that the O-ring will not contact a flexible diaphram of a transducer and thereby cause erratic or unreliable transducer readings. This function will be discussed in detail subsequently.

FIG. 2 illustrates a relatively thin ceramic disc 22 having a diameter approximately equal to the diameter of the top surface 11 and a thickness dimension substantially less than the thickness dimension T. The disc 22 functions as a diaphragm means for a ceramic capacitor transducer. The disc 22 has a planar circular surface 23 upon which a circular metallization area 24 is deposited, the diameter of the circular metallization 24 being substantially greater than the diameter of the circular metallization 19 on the base substrate top surface 11. The metallization 24 extends over substantially all of a central portion of the planar surface 23 and a radial finger projection of metallization 25 extends from the circular area 24 radially outward into a planar annular peripheral portion 26 along the perimeter of the surface 23 which surrounds the metallization 24.

FIG. 3 illustrates a mounting spacer disc 27 which resembles a flat cylindrical disc which has a diameter dimension greater than the bottom surface 12 of the base substrate and which has four through holes 28 through 31. The base substrate 10 is intended to rest on the mounting spacer 27 with the through holes 28 and 30 corresponding to the through holes 13 and 14, respectively, and one of the holes 29 and 31 corresponding to the through hole 17. The function of the mounting disc 27 will be apparent when considered in conjunction with the transducer assembly illustrated in FIG. 4.

FIG. 4 illustrates an improved pressure transducer assembly 32 which comprises a transducer including the base substrate 10 illustrated in FIG. 1 and the diaphragm disc 22 illustrated in FIG. 2, in combination with the mounting spacer disc 27 illustrated in FIG. 3 assembled together and mounted in a generally rectangular in cross-section transducer housing 33. Identical reference numbers are used to identify components in FIG. 4 which correspond to the components shown in FIGS. 1, 2 and 3.

Basically, the diaphragm disc 22 is mounted to the base substrate 10 by the annular glass ring 16 bonding the annular peripheral portion 26 of the surface 23 surrounding the metallization 24 to the annular peripheral portion 15 of the top base substrate surface 11. The annular glass ring 16, the planar central portion of the diaphragm surface 23 within the annular glass ring 16 and the central area of the top surface 11 within the annular glass ring 16 form an internal cavity 34, and the vacuum entryway 17 extends from the bottom surface 12 of the base substrate through the base substrate into the cavity 34. The cavity 34 is formed by assembling the diaphragm disc 22 to the base substrate 10, as shown in FIG. 4, and then subjecting these components to a high temperature at which the glass annular ring 16 softens and thereby bonds the disc 22 to the substrate 10 with a substantially hermetic seal. A sealing means 35, preferably a solder seal, is present on the surface 12 and effectively seals the vacuum entryway 17 which opens onto the surface 12 such that the cavity 34 is essentially air tight.

A reference vacuum pressure is stored in the cavity 34 by applying a vacuum to this cavity through the vacuum entryway 17 and subsequently sealing this entryway by the sealing means 35. In this manner, the cavity 34 is maintained at a vacuum reference pressure which results in flexing the diaphragm disc 22 inward toward the base surface 11 such that a predetermined spacing exists between the electrode metallizations 18 and 24. When various pressures are applied exterior to the cavity 34 of the pressure transducer, comprising the diaphragm 22 and the base substrate 10, these various pressures will cause the disc 22 to flex and thereby slightly increase or decrease the spacing between the electrode metallizations 18 and 24. This in turn results in changing the capacitance between these two electrode metallizations, and it is this capacitance change which is monitored by not shown electrical circuitry to produce an indication of the magnitude of the external pressure being applied to the diaphragm disc 22.

FIG. 4 illustrates that the diaphragm 22 and the base 10 are assembled such that the metallizations 18 and 24 directly face each other across a gap which is part of the cavity 34 thereby effectively forming a parallel plate capacitor. A first external electrical connection lead 36 is inserted through the peripheral through hole 14. It is contemplated that this external lead will be connected by some suitable conductive means, such as conductive epoxy, to the finger projection metallization 20. Thus lead 36 represents the external lead connection to the metallization 18 which serves as one electrode of the parallel plate capacitor. Similarly, an external lead 37 is contemplated as passing through the peripheral through hole 13 such that it will electrically contact the radial finger metallization 25 of the diaphragm disc 22. In this manner, the external lead 37 will be connected to the metallization 24 that serves as the other electrode of the parallel plate capacitor.

The transducer comprising the flexible diaphragm 22 and the base substrate 10 is contemplated as being mechanically mounted within the transducer housing 33 as shown in FIG. 4. A circular rubber sealing O-ring 38, which is held in place by substantially annular shoulders 39 formed on an interior wall 40 of the housing 33, rests on the flange 21 of the base substrate. The mounting spacer disc 27 compresses the O-ring 38 by pressing the base substrate 10 towards the wall 40. This can be accomplished by assembling the transducer, the O-ring 38 and the disc 27 and then screwing a housing wall 41 to the housing 33 as shown in FIG. 4.

A through hole 42 is provided in the housing wall 40. The housing wall 40, the O-ring 38 and the diaphragm disc 22 essentially form an exterior cavity 43 to which various pressures are applied via the opening 42. It is these various pressures which exist in the cavity 43 that are sensed by the pressure transducer. Thus the capacitance created between the external leads 36 and 37 represents a measure of the various pressures applied to the cavity 43 with respect to the vacuum reference pressure stored in the internal cavity 34.

Since the rubber O-ring 38 does not contact the flexible diaphragm 22 in the transducer assembly 32 shown in FIG. 4, substantially no stress is applied to the diaphragm by mounting the transducer as shown in FIG. 4. This results in having no unpredictable force being applied to the diaphragm which may result in erratic pressure transducer readings. Thus the present invention has provided an improved pressure transducer assembly by providing an annular flange on the base substrate 10 for receiving the sealing O-ring 38 as part of the mounting apparatus for the transducer.

While FIG. 4 illustrates a preferred embodiment of the present invention, embodiments such as having the flange non-integral with the base substrate or having the flange 21 with a surface extending laterally in the same plane as the planar top surface 11 and beyond either the diaphram disc 22 or the peripheral portion 15 of the top surface are contemplated, as long as the O-ring is not in direct contact with the diaphragm.

Preferably, the metallizations 19, 20, 24 and 25 are screen printed onto the ceramic base substrate 10 and the ceramic disc 22, respectively. In addition, the annular glass ring 16 is also contemplated as being screen printed onto the surface 11 of the base substrate 10. Preferably, the annular glass ring 16 will comprise a thick film glass paste which contains glass particles that will soften at a moderately high temperatures and thereby bond the peripheral portion of the disc 22 to the annular peripheral portion of the surface 11 of the base substrate 10. Any type of convenient sealing mechanism can be used for the sealing means 35 since the function of this means is just too close off the vacuum entryway 17 after an appropriate reference vacuum pressure has been applied to the cavity 34. The ceramic material preferably used for the base 10 and disc 22 of the present invention is alumina ($Al_2O_3$) which has a dielectric constant of 9. The spacer disc 27 and the housing 33, including the walls 40 and 41, are preferably made of a plastic non-conductive material.

While I have shown and described specific embodiments of this invention, further modifications and improvements will occur to those skilled in the art. All such modifications which retain the basic underlying principles disclosed and claimed herein are within the scope of this invention.

I claim:

1. A pressure transducer assembly comprising:

a pressure transducer including, base substrate means having a top surface with a peripheral portion and a bottom surface, flexible diaphram means having a planar central portion and a surrounding peripheral portion along the perimeter of the diaphragm means, mounting means for mounting said peripheral portion of said diaphragm means to said base substrate top surface peripheral portion, said mounting means, said diaphragm planar central portion and said substrate top surface generally forming an internal cavity, said diaphragm central portion being displaceable with respect to said top surface in response to pressure changes, wherein said internal cavity maintains a reference pressure and pressures applied exterior to said internal cavity cause said diaphragm means to flex and thereby alter electrical characteristics of said transducer in response to pressure changes, and a flange means attached to said base substrate means and extending laterally with respect to and beyond said top surface peripheral portion and said peripheral portion of said diaphragm means, whereby said flange means forms a mounting ledge by which said transducer can be mounted without applying stress to said diaphragm means;

housing means for providing a substantially closed package for housing said pressure transducer within said housing means, said housing means having a wall to which said pressure transducer is to be mounted;

annular sealing means mounted on said flange means and positioned laterally beyond the perimeter of said diaphragm means; and means mounting said annular sealing means and said pressure transducer to said wall, said annular sealing means contacting an interior surface of said wall and said flange means and sealing and forming an external cavity between said interior surface of said wall and said diaphragm means, said annular sealing means determining the spacing between said interior surface of said wall and said diaphragm means, said wall having a hole therethrough extending into said internal cavity through which pressures are applied exterior to said interior cavity to cause said diaphragm means to flex and thereby alter electrical characteristics of said pressure transducer in response to pressure changes, said hole being substantially smaller than the lateral dimensions of said diaphragm means, wherein said top surface peripheral portion of said base substrate means is planar, and wherein said flange means is located below said plane of said peripheral portion of said base substrate means top surface and between said top and bottom surfaces of said base substrate means.

2. A pressure transducer assembly according to claim 1 wherein said flange means is an integral part of said base substrate means.

3. A pressure transducer assembly according to claim 1 wherein said peripheral portion of said base substrate top surface means is annular, said diaphragm means comprises a disc-shaped plate and said base substrate means, without said flange means, comprises a generally cylindrical substrate.

4. A pressure transducer assembly according to claim 3 wherein said flange means is an annular projection of said base substrate means.

5. A pressure transducer assembly according to claim 4 wherein said annular sealing means comprises an O-ring of elastic material.

6. A pressure transducer assembly according to claim 5 wherein said base substrate means has at least two through holes, an electrical lead passing through each of said through holes, and wherein said mounting means mounting said transducer and O-ring to said wall is mounted flush with said bottom surface and has through holes corresponding to said base substrate means holes for passing said leads therethrough, said same mounting means comprising a disc-shaped plate having lateral dimensions extending to at least the lateral dimensions of said flange means, and wherein said flange means has an upper surface portion on which said annular sealing means rests and a lower surface portion coplanar with said base substrate means bottom surface.

7. A pressure transducer according to claim 2 wherein said base substrate means and integral flange means are ceramic.

8. A pressure transducer assembly according to claim 7 wherein said housing wall is non-conductive plastic material.

9. A pressure transducer assembly according to claim 6 wherein said flange means is an integral part of said base substrate means.

10. A pressure transducer assembly according to claims 1, 2, 5, or 7 wherein said pressure transducer is a capacitive transducer having a first electrode on said top surface of said base substrate means and a second electrode on said diaphragm means, said second electrode separated from said first electrode by a gap forming a portion of said internal cavity.

11. A pressure transducer according to claim 5 wherein said O-ring, when resting on said flange means, extends from said flange means above and beyond said base substrate means top surface and said diaphragm means mounted on said base substrate means top surface.

12. A pressure transducer assembly according to claim 11 wherein said interior surface of said wall has substantially annular shoulders formed thereon and wherein said O-ring is received with these shoulders.

* * * * *